United States Patent [19]

Yoshikawa

[11] Patent Number: 5,720,255
[45] Date of Patent: *Feb. 24, 1998

[54] CONTROL VALVE FOR MULTI-VALVE ENGINE

[75] Inventor: Masaaki Yoshikawa, Iwata, Japan

[73] Assignee: Yamaha Hatsudoki Kabushiki Kaisha, Iwata, Japan

[*] Notice: The term of this patent shall not extend beyond the expiration date of Pat. No. 5,477,823.

[21] Appl. No.: 386,009

[22] Filed: Feb. 9, 1995

Related U.S. Application Data

[63] Continuation-in-part of Ser. No. 363,708, Dec. 23, 1994.

[30] Foreign Application Priority Data

Feb. 14, 1994 [JP] Japan ................................. 6-017562

[51] Int. Cl.⁶ .......................................... F02D 9/08
[52] U.S. Cl. ........................................ 123/337; 123/308
[58] Field of Search ........................... 123/308, 432, 123/336, 337

[56] References Cited

U.S. PATENT DOCUMENTS

| | | |
|---|---|---|
| 1,727,265 | 9/1929 | Aseltine . |
| 3,318,292 | 5/1967 | Hideg . |
| 3,408,992 | 11/1968 | Von Seggern et al. . |
| 4,105,577 | 8/1978 | Yamashita . |
| 4,174,686 | 11/1979 | Shimizu et al. . |
| 4,228,772 | 10/1980 | Bakonyi . |
| 4,240,387 | 12/1980 | Motosugi et al. . |
| 4,256,062 | 3/1981 | Schafer . |
| 4,269,153 | 5/1981 | Kunii et al. . |
| 4,286,561 | 9/1981 | Tsutsumi . |
| 4,294,205 | 10/1981 | Iiyama et al. ............... 123/336 |
| 4,308,830 | 1/1982 | Yamada et al. . |
| 4,317,438 | 3/1982 | Yagi et al. . |
| 4,320,725 | 3/1982 | Rychlik et al. . |
| 4,356,801 | 11/1982 | Graham ....................... 123/337 |
| 4,413,598 | 11/1983 | Tsutsumi . |
| 4,452,218 | 6/1984 | Yokoyama et al. . |
| 4,499,868 | 2/1985 | Kanda et al. . |
| 4,543,931 | 10/1985 | Hitomi et al. . |
| 4,663,938 | 5/1987 | Colgate . |
| 4,669,434 | 6/1987 | Okumura et al. . |
| 4,699,104 | 10/1987 | Okumura . |
| 4,700,669 | 10/1987 | Sakurai et al. . |
| 4,719,886 | 1/1988 | Kotani et al. . |
| 4,753,200 | 6/1988 | Kawamura et al. . |
| 4,762,102 | 8/1988 | Kanda . |

(List continued on next page.)

FOREIGN PATENT DOCUMENTS

| | | |
|---|---|---|
| 0054964 | 12/1981 | European Pat. Off. . |
| 0068481 | 6/1982 | European Pat. Off. . |
| 0074202 | 8/1982 | European Pat. Off. . |
| 0076632 | 4/1983 | European Pat. Off. . |
| 137393 | 4/1985 | European Pat. Off. ............... 123/308 |
| 0235288 | 8/1985 | European Pat. Off. . |
| 0221312 | 10/1985 | European Pat. Off. . |
| 2569227 | 8/1986 | France . |
| 2709519 | 9/1977 | Germany . |
| 3429414 | 2/1985 | Germany . |
| 3638021 | 5/1987 | Germany . |
| P10373 | 3/1918 | Japan . |
| P10369 | 3/1928 | Japan . |

(List continued on next page.)

Primary Examiner—Erick R. Solis
Attorney, Agent, or Firm—Knobbe, Martens, Olson & Bear LLP

[57] ABSTRACT

A control valve arrangement for a three-valve-per-cylinder internal combustion engine that redirects the flow through a siamese-type intake passage when in its closed position so as to generate a higher velocity to the intake charge and redirect the flow so as to generate turbulence in the combustion chamber. A number of embodiments of control valves are disclosed, each being of the plate-type and being mounted in a generally oval intake passage on a control valve shaft in such a way that the control valve shaft provides minimum obstruction to the flow through the intake passage, regardless of its position.

35 Claims, 9 Drawing Sheets

U.S. PATENT DOCUMENTS

| | | |
|---|---|---|
| 4,779,594 | 10/1988 | Oda et al. . |
| 4,827,883 | 5/1989 | Khalighi et al. . |
| 4,834,035 | 5/1989 | Shimada et al. . |
| 4,974,566 | 12/1990 | LoRusso et al. . |
| 4,995,359 | 2/1991 | Yokoyama et al. . |
| 4,998,518 | 3/1991 | Mitsumoto . |
| 5,273,014 | 12/1993 | Mitobe et al. .......................... 123/308 |
| 5,408,969 | 4/1995 | Obaraki .................................. 123/336 |
| 5,477,823 | 12/1995 | Uchida .................................... 123/432 |

FOREIGN PATENT DOCUMENTS

| | | |
|---|---|---|
| P10370 | 3/1928 | Japan . |
| 51-54007 | 12/1976 | Japan . |
| 56-43428 | 4/1981 | Japan . |
| 59-120718 | 2/1984 | Japan . |
| 61-12940 | 1/1986 | Japan . |
| 61-25916 | 2/1986 | Japan . |
| 61-28715 | 2/1986 | Japan . |
| 63-32122 | 2/1988 | Japan . |
| 63-73534 | 5/1988 | Japan . |
| 2115922 | 9/1990 | Japan . |
| 2230920 | 9/1990 | Japan . |
| 5187276 | 7/1993 | Japan ..................................... 123/337 |
| 595767 | 2/1994 | Japan . |
| 60523 | 1/1948 | Netherlands . |
| 652671 | 5/1951 | United Kingdom . |
| 1135482 | 12/1968 | United Kingdom . |
| 1293772 | 12/1969 | United Kingdom . |
| 1457152 | 6/1974 | United Kingdom . |
| 2016081 | 9/1979 | United Kingdom . |
| 2027796 | 2/1980 | United Kingdom . |
| 2064646 | 6/1981 | United Kingdom . |
| 2087480 | 5/1982 | United Kingdom . |
| 2107780 | 5/1983 | United Kingdom . |
| 2196386 | 4/1988 | United Kingdom . |
| 2196388 | 4/1988 | United Kingdom . |
| 2242226 | 9/1991 | United Kingdom . |
| 7900501 | 8/1979 | WIPO . |
| 9114858 | 10/1991 | WIPO . |

CONTROL VALVE FOR MULTI-VALVE ENGINE

CROSS-REFERENCE TO RELATED APPLICATION

This application is a continuation-in-part of my copending application entitled "Multi-Valve Engine," Ser. No. 08/363,708 filed Dec. 23, 1994 and assigned to the assignee hereof.

BACKGROUND OF THE INVENTION

This invention relates to a multi-valve internal combustion engine and more particularly to a control valve for altering the flow through the intake passage of such an engine.

As is noted in my copending application aforenoted, Ser. No. 08/363,708, the performance of an internal combustion engine can be significantly improved through the use of multiple intake valves. That application discloses an arrangement wherein the engine is provided with five valves per cylinder and employs three intake valves for each cylinder. Such an arrangement is very effective in providing maximum power outputs.

Because of the free breathing capability of such engines, however, performance at low and mid-ranges may be deteriorated. The reason for this is that the free breathing intake passage arrangement employed with such three intake valve per cylinder engines, does not introduce any significant turbulence in the combustion chamber. Although this is good for providing high volumetric efficiencies at wide open throttle, it can result in deteriorated performance at lower speeds.

Therefore, it is a principal object of this invention to provide an improved control valve arrangement for such engines wherein the flow through the intake passage at high speed is substantially unrestricted, but turbulence can be generated at low speeds and low load conditions.

The way in which turbulence is generated in the combustion chamber is by providing a control valve in the intake passage that redirects the flow into the combustion chamber and restricts it under some running conditions. The restriction in flow increases the velocity of the charge entering the combustion chamber and the redirection of the flow can be used to create further turbulence by inducing tumble and/or swirl in the combustion chamber when the control valve is in its flow controlling position.

A wide variety of flow control valves have been proposed in the art. For the most part, these control valves have been designed primarily for engines having one or two intake valves per cylinder. With such arrangements, the prior art has provided relatively simple arrangements wherein tumble and/or swirl may be generated. This is facilitated with the prior art type of arrangement because either one or two intake valves per cylinder are generally oriented symmetrically in the combustion chamber, along one side of a plane containing the axis of the cylinder bore.

However, when three valves per cylinder are employed, there normally are provided a pair of side valves which are closer to the plane than the remaining, center intake valve. In fact, at times the side intake valves may extend partially over the plane onto the exhaust side of the cylinder head. With such arrangements it is more difficult to generate tumble in the combustion chamber. It has been found that tumble is a particularly effective way of introducing turbulence with some engines.

It is, therefore, a further object of this invention to provide an improved control valve arrangement for a three-valve-per-cylinder engine.

It is a further object of this invention to provide an improved tumble control valve for a three-valve-per-cylinder engine.

When flow controlling valves are provided in the induction system for an engine, particularly one having multiple valves per cylinder, the control valve can take on a relatively complicated construction. This adds significantly to the cost of the engine.

It is, therefore, a still further object of this invention to provide a relatively simple and yet highly effective flow controlling valve for a three-valve-per-cylinder engine.

It has been discovered that the control valve arrangement for a three-valve-per-cylinder engine can be significantly simplified if a siamese intake passage serves at least two and preferably all of the intake valves for each cylinder. When this is done, a single control valve can be employed for each cylinder. However, the type of control valves previously employed have been comprised of cylindrical valve bodies that have flow controlling grooves formed in their exterior surface so as to provide either an unrestricted flow passage in one position or a flow redirecting path in the other position. Obviously such valves are quite expensive to manufacture and the cylinder head or valve body required for this three-dimensional type of valve also becomes costly and bulky.

It is, therefore, a still further object of this invention to provide an improved butterfly-type flow controlling valve for a three-valve-per-cylinder engine.

When a three-valve-per-cylinder engine employs a siamese intake passage that serves all of the valve seats, the common portion of the intake passage may and frequently does assume a generally oval configuration. The long dimension of the oval generally extends in a direction that is parallel to the crankshaft and camshaft axes of the engine. As a result of this, the butterfly-type control valves which might normally be employed have their axes extending along this long direction and the valve shaft on which the control valve is fixed also extends in this direction through the intake passage. This has several disadvantages.

First, since the control valve shaft and also the control valve, even when in its open position, extends in this long direction, a fairly substantial portion of the flow area is obstructed, even when the control valve is in a fully opened position.

Furthermore, this positioning of the control valve shaft and its rotational axis can also cause it to pass through the area which should be left open when the control valve is in its flow redirecting position. That is, the control valve being a plate-type valve, has a configuration when in its flow redirecting position so that a substantial portion of the intake passage, or at least the common portion of the intake passage, is restricted. The way in which this restriction is done will control both the direction of the flow into the combustion chamber through the individual valve seats and can also be employed for substantially restricting or shutting off the flow through certain of the valve seats. To accomplish this frequently requires a cutout in the shape of a plate-type valve, which cutout may pass through the axis of the control valve shaft. As a result, the shaft itself can cause some obstruction to the desired flow pattern.

It is, therefore, a still further object of this invention to provide an improved plate-type control valve for use in intake passages having generally oval configurations.

SUMMARY OF THE INVENTION

A first feature of the invention is adapted to be embodied in an induction system for an internal combustion engine served by at least three intake valve seats. An intake passage arrangement comprised of at least a common section serving each of the intake valve seats is provided. A butterfly-type control valve is supported for pivotal movement in the common section about an axis passing through the common section for controlling the flow therethrough. This butterfly-type control valve is moveable between a first position wherein the flow through each of the valve seats is substantially restricted and without significantly affecting the flow direction issuing from the intake valve seats into the combustion chamber and a second position. In the second position, at least a substantial portion of the flow area is substantially restricted by a body of the butterfly-type control valve. The body has a relief formed therein which defines a restricted flow area through the common section for directing the flow through at least one of the valve seats into the combustion chamber in a different direction than when said butterfly-type control valve is in its first position. The pivot axis of the butterfly-type control valve is spaced from the relief.

Another feature of the invention is adapted to be embodied in an induction system for an internal combustion engine that has a combustion chamber served by an intake passage arrangement which has a generally oval cross-sectional section. A butterfly-type control valve is supported for pivotal movement in this oval shaped section. The rotational axis of the butterfly-type control valve extends parallel to the short dimension of the oval passage.

DETAILED DESCRIPTION OF THE PREFERRED EMBODIMENTS OF THE INVENTION

Figure 1:
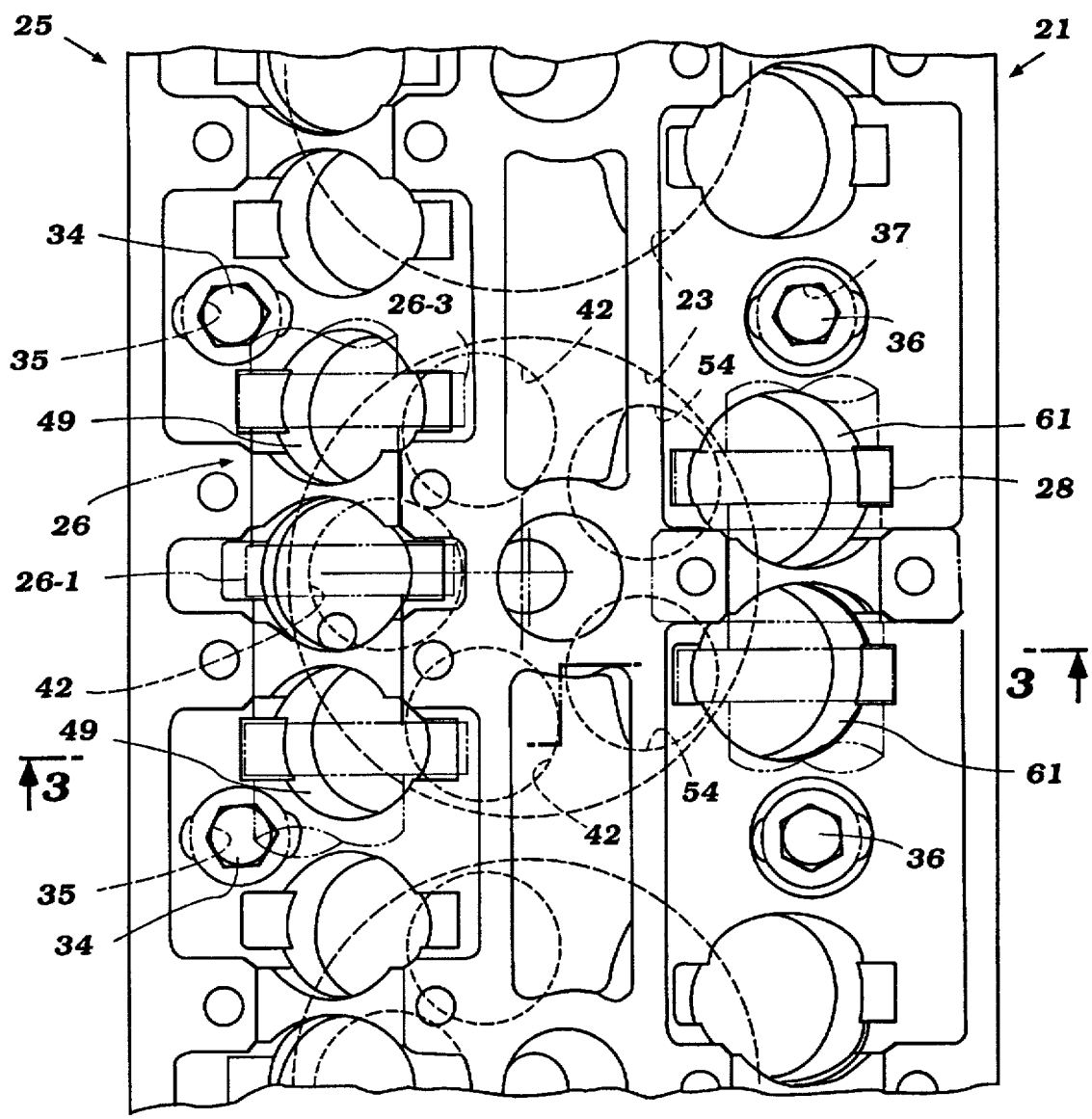
FIG. 1 is a top plan view of a portion of a cylinder head of an engine constructed in accordance with an embodiment of the invention, with the camshafts, tappets, and valves removed, but showing the cylinder bore and valve seats in broken lines.

As should be readily apparent from the foregoing description, the invention relates primarily to a flow control valve for a three valve per cylinder engine. In fact, certain features of the invention may be employed with engines having a different number of intake valves or even only one intake valve per cylinder. Since the invention deals primarily with the control valve, the total engine is not illustrated, nor will it be described. Where any portion of the engine is not described, it may be considered to be either a conventional or may be of the type as disclosed in my aforenoted copending application, the disclosure of which is incorporated herein by reference. However, in order to facilitate the understanding of the construction and operation of the control valve, a portion of the engine will be described.

Referring first primarily to FIGS. 1–5, the engine is shown partially and is identified generally by the reference numeral 21. This engine 21 is comprised by a cylinder block 22 in which a plurality of aligned cylinder bores 23 are formed. Although the invention is described in conjunction with an in-line multi-cylinder engine, it will be readily apparent to those skilled in the art how the invention can be utilized in conjunction with engines having other cylinder numbers and other cylinder configurations. Pistons 24 are supported for reciprocation within the cylinder bores 23 and are connected in a suitable manner to a crankshaft for driving it. Conventional connecting rods may be employed for this purpose, although the invention is not limited to such arrangements, as should be readily apparent from the foregoing description.

A cylinder head assembly, indicated generally by the reference numeral 25, is affixed in a manner, as will be described, to the cylinder block 22. An intake camshaft 26 is rotatably journalled in the cylinder head assembly 25, on one side of a plane 27 that contains the axis of the cylinder bores 23 and which also passes through or parallel to the axis of rotation of the engine crankshaft. An exhaust camshaft 28 is journalled in the cylinder head 25 on the other side of the plane 27. The intake and exhaust camshafts 26 and 27 are driven in a suitable manner at one-half the crankshaft speed, as is well known in this art. This drive may be of the type described in my aforenoted copending application. In addition, the manner in which the intake and exhaust camshafts 26 and 28 are journalled in the cylinder head 25 is also as described in that copending application.

The cylinder head 25 has a lower surface 29 that is brought into sealing engagement with an upper surface 31 of the cylinder block 22 around the individual cylinder bores 23. The cylinder head surface 29 surrounds individual combustion chamber recesses 32 formed in the lower surface 29 of the cylinder head 25. These recesses 32 cooperate with the cylinder bores 23 and the heads of pistons 24 to form the combustion chambers of the engine. As described in the copending application of Masaski Yoshikawa entitled ENGINE COMBUSTION CHAMBER AND AIR INTAKE DEVICE, Ser. No. 08/354,539, filed Dec. 13, 1994, which application is a continuation-in-part of this copending application entitled ENGINE AIR INTAKE DEVICE, Ser. No. 08/197,610, filed Feb. 17, 1994, which applications are assigned to the assignee hereof, the head of the piston 24 is formed with a recess 33 which cooperates with the cylinder bore 23 and cylinder head recess 32 to form a lens-shaped combustion chamber. The disclosures of these other co-pending applications are incorporated herein by reference.

The cylinder head 25 is affixed in this sealing relationship to the cylinder block 22 by a plurality of threaded fasteners which generally comprise a first pair of fasteners 34 which are disposed on the intake side of the cylinder head 25 and which are spaced transversely outwardly relative to the cylinder bore axis, a distance that is greater than the distance the axis of rotation of the intake camshaft 26 from the plane 27 containing the cylinder bore axis and the axis of rotation of the crankshaft. This distance of the intake camshaft axis from the plane 27 is indicated by the dimension $L_1$ in FIG. 3 and 4. The fasteners 34 pass through suitable bores 35 formed in the cylinder head 25. The fasteners 34 may be bolts as shown or may be comprised of studs with nuts being affixed to the upper ends thereof, as is well known in this art.

A second series of threaded fasteners 36 pass through openings 37 formed in the cylinder head 25 on the exhaust side of the cylinder head 25. It should be noted that the axes of rotation of the exhaust camshaft 28 is disposed at a distance $L_2$ from the aforenoted plane 27, which distance is greater than the distance $L_1$. As a result, the threaded fasteners 36 lie beneath the exhaust camshaft 28 as clearly shown in FIGS. 3 and 4.

The threaded fasteners 34 and 35 are disposed an equal distance from the cylinder bore axis and thus maintain good and uniform hold down torque on the cylinder head 25 and cylinder block 22. The threaded fasteners 34 and 36 between the adjacent cylinders serve the hold down function for the cylinder head 25 over the adjacent cylinders.

An intake passage, indicated generally by the reference numeral 38 is formed on the side of the cylinder head 25 where the intake camshaft 26 is journalled. The intake passage 38 is a siamese passage that begins with a generally oval shaped opening 39 formed in an external surface 41 of the cylinder head 25 to which a control valve assembly, to be described, and an appropriate intake manifold (not shown) is affixed for delivering at least an air charge to the combustion chamber recesses 32. As may be seen in the figures, the oval shaped intake passage 38 is formed with a major axis that extends transversely to the direction of flow therethrough and in the plane of FIG. 6 and a minor axis which is substantially smaller than the major axis and which extends perpendicularly to it. As is noted, the intake passage 38 is of the siamese-type and from the common inlet opening 39 the passage 38 splits into three branch passages comprised of a center portion 38-1 and a pair of side portions 38-2 and 38-3. These portions all end in respective intake valve seats 42 which are either pressed or cast in place in the cylinder head 25.

The valve seat 42 associated with the center intake passage 38-1 is disposed adjacent the peripheral edge of the cylinder bore 23 and is furthest from the plane 27 containing the cylinder bore axis and the axis of rotation of the crankshaft. The intake valve seats 42 associated with the side intake passages 38-2 and 38-3 lie closer to and, in fact, extend partially over this plane 27 onto the exhaust side of the cylinder head 25.

Figure 3:
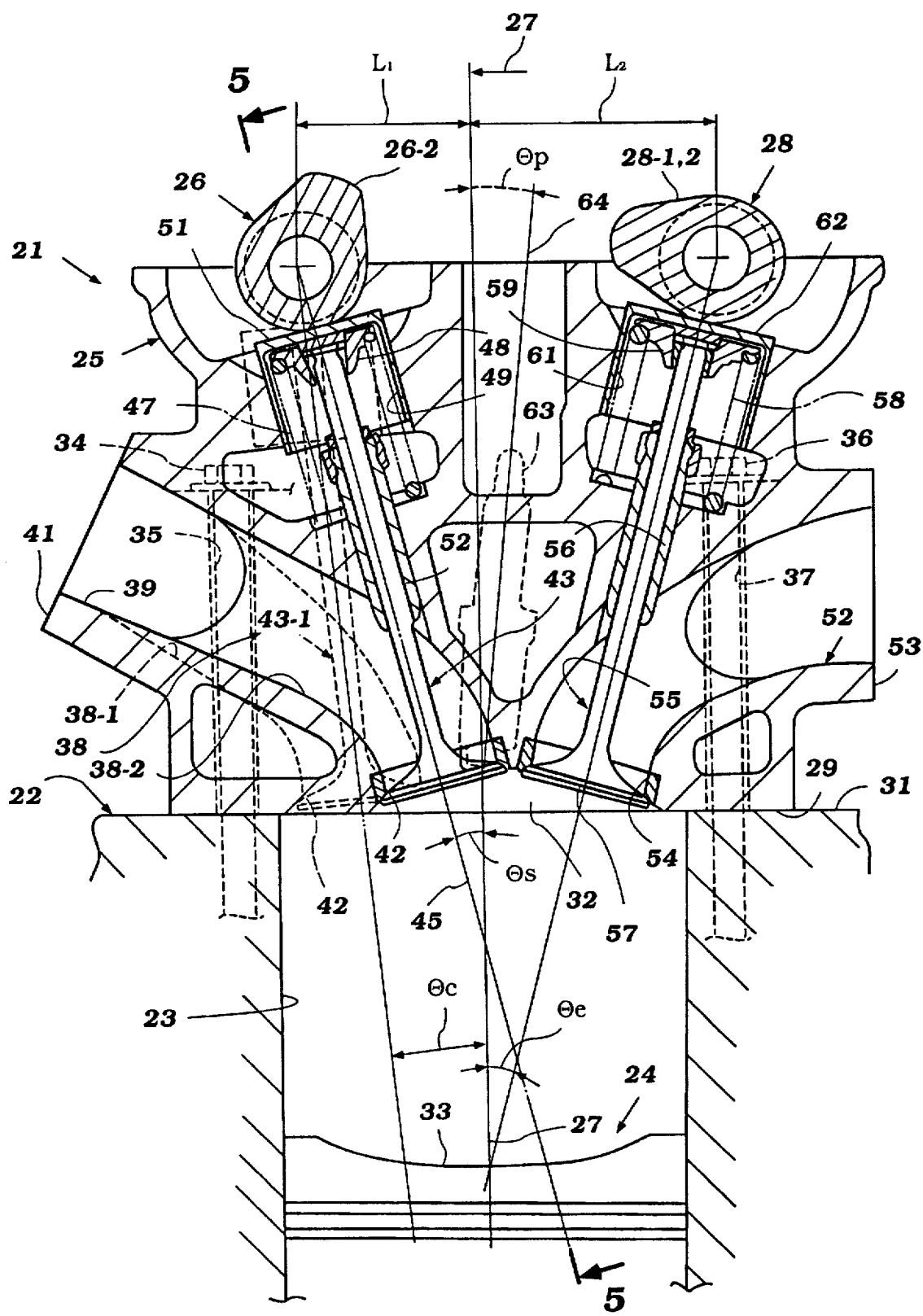
FIG. 3 is a cross-sectional view taken along the line 3—3 of FIG. 1.
Figure 4:
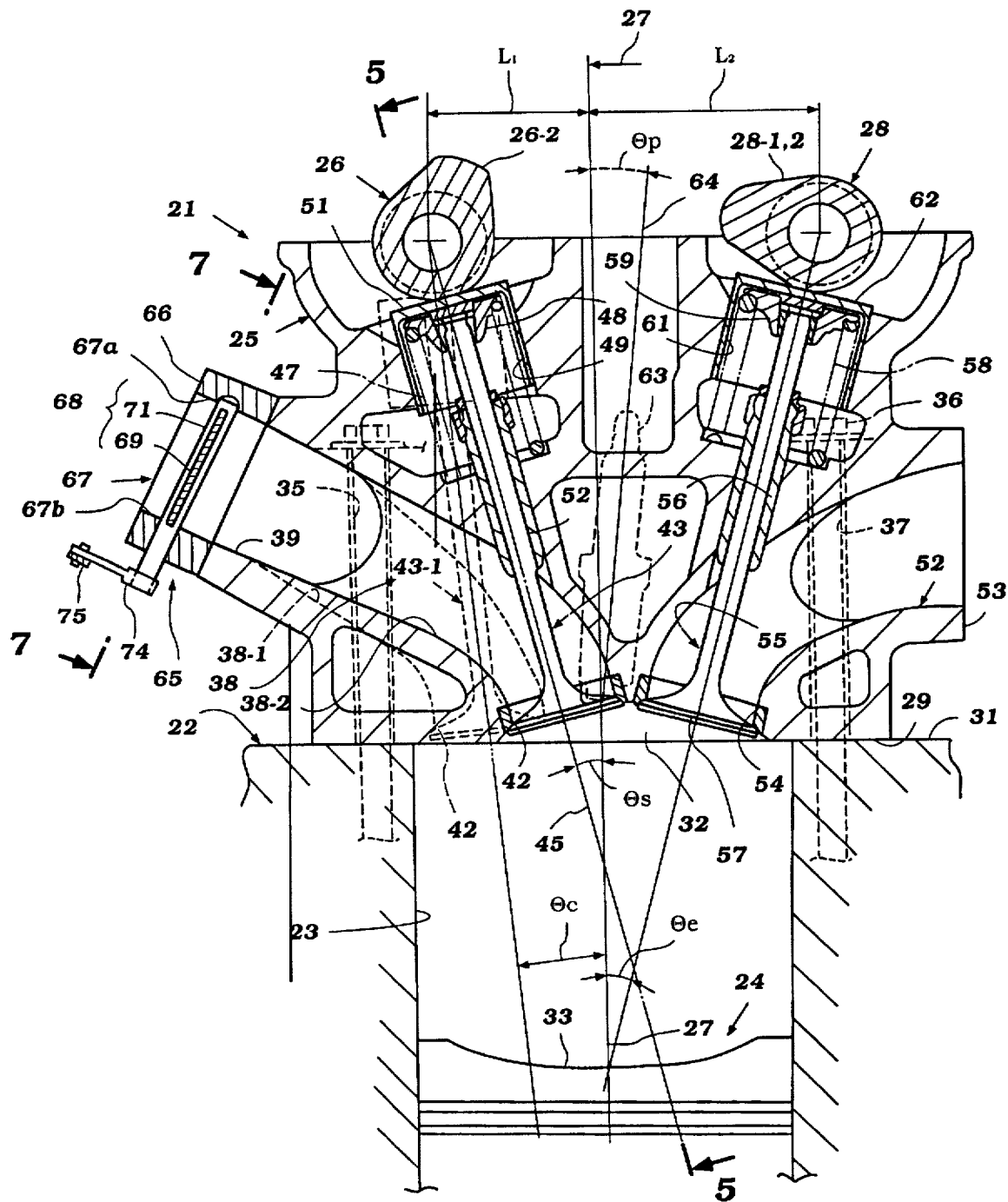
FIG. 4 is a cross-sectional view, in part similar to FIG. 3, but shows the control valve body affixed to the cylinder head and is on a slightly smaller scale than FIG. 3.

Poppet-type intake valves comprised of a center intake valve 43-1 and side intake valves 43-2 and 43-3 are slidably supported in respective valve guides 44 in the cylinder head 25 and have their head portions in cooperating relationship with the valve seats 42 so as to control the flow entering the combustion chamber 32 through the intake passages 38-1, 38-2 and 38-3. As described in my aforenoted copending applications, looking in the planes extending perpendicularly to the plane 27 as shown in FIGS. 3 and 4, the side intake valves 43-2 and 43-3 reciprocate about axes that lie in a common plane 45 and which is disposed at an acute angle $\theta s$ to the plane 27. The center intake valve 43-1 has its reciprocal axis 46 lying at an acute angle $\theta 6$ to the plane 27 but this acute $\theta c$ angle is lesser than that ($\theta s$) of the side intake valves.

As a result of this positioning, the flow of the intake charge entering the combustion chamber through the center intake passage 38-1 and its associated valve seat 42 will flow in a direction generally parallel to the cylinder bore axis while the flow from the side intake valve seats associated with the side intake passages 38-2 and 38-3 will tend to flow across the cylinder bore axis and generate a tumble motion to the charge inducted into the combustion chamber.

Figure 5:
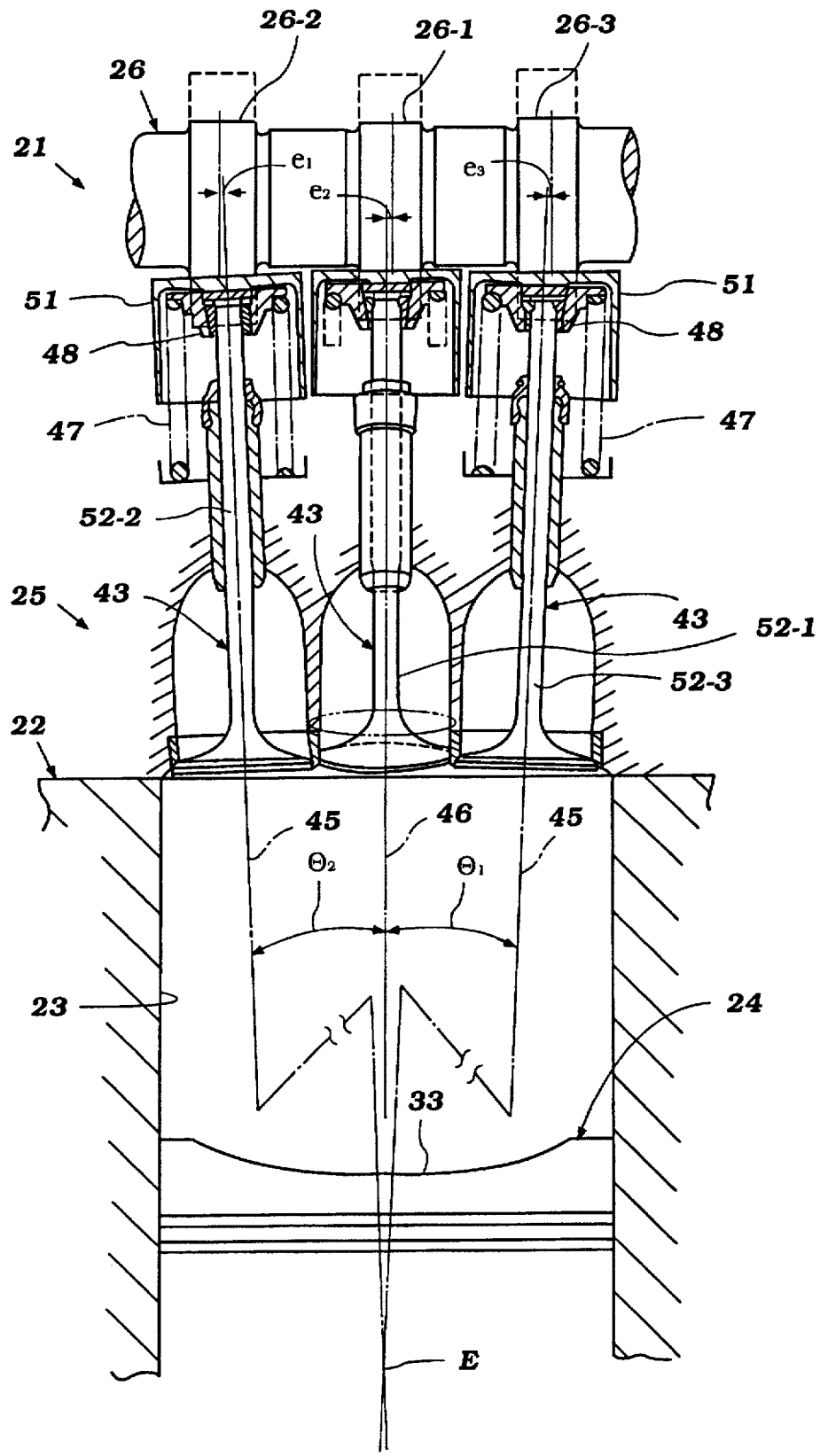
FIG. 5 is a cross-sectional view taken along the line 5—5 of FIGS. 3 and 4.

When viewed in a direction perpendicular to the direction of FIGS. 3 and 4 as shown in FIG. 5, it will be noted that the side intake valves 43-2 and 43-3 have their axes 45 slightly skewed at an angle $\theta 1$ relative to the axis 45 of reciprocation of the center intake valve 43-1 so that the flow paths will intersect at a point E which is disposed below the head of the piston 24 when it is in its bottom dead center position as shown in FIG. 5. This ensures that there will be no conflicting flow from the various intake passages 38-1, 38-2 and 38-3 that could interfere with the tumble motion generated to the intake charge.

The intake valves 43 are each urged to their closed positions by respective coil compression springs 47 that are loaded between a machined surface formed on the upper portion of the cylinder head 25 and a keeper retainer assembly 48 that is affixed to the upper end of the stems of the respective intake valves 43.

The cylinder head 25 is provided with an upstanding wall in the area on the intake side of each cylinder bore 23 that is formed with a plurality of bores 49 for receiving respective thimble tappets 51 that are associated with the keeper retainer assembly 48 and the upper ends of the stems of the intake valve 43 for their operation. It should be noted that these bores 49 are skewed so that they extend parallel to the axes of reciprocation of the respective valve 43-1, 43-2 and 43-3. Because of this skewing, the area of the wall between the lower ends of the bore 49 is less than that at the upper ends. This is done so as to maintain a relatively compact cylinder head configuration.

The intake camshaft 26 is provided with three lobes for each cylinder bore 23 comprised of a center lobe 26-1 which cooperates with the tappet 49 of the center intake valve 43-1 and a pair of side lobes 26-2 and 26-3 which cooperate with the tappets 49 for actuating the side intake valve 43-2 and 43-3. It should be noted that the center of each lobe 26-1, 26-2 and 26-3 is offset slightly from the center of the respective tappet 49 and respective valve stems 52-1, 52-2 and 52-3. In viewing FIG. 5, it will be seen that the lobe 26-1 is offset from the center of the intake valve 43-1 toward the right hand side of the figure by a distance $e_2$. The lobe 26-3 is offset relative to the axis of the intake valve 43-3 and its tappet 49 in the same direction but by a slightly different amount $e_3$. The remaining cam lobe 26-2 is offset from the center of its intake valve 43-2 and tappet 49 by a dimension $e_1$ which may be slightly greater than the dimension $e_2$ but in the opposite direction (to the left). This offsetting of the centers of the cam lobes 26-1, 26-2 and 26-3 relative to the tappets 49 will cause a slight degree of rotation of the tappets 49 during the running of the engine so as to make wear both on the tappets 49, cylinder head bores 48 and cam lobes 26-1, 2 and 3 more uniform.

As a result, the distance between the center of the center lobe 26-1 and the side lobe 26-2 is greater than the distance between the center lobe 26-1 and the other side lobe 26-3. As a result, the bearing surface form between the cam lobes 26-1 and 26-2 and 26-1 and 26-3, respectively, will have a different effective lengths.

Finally, it should be noted that the lobes 26-2 and 26-3 are tapered so as to accommodate the skewed axes of the side intake valves 43-2 and 43-3.

Figure 2:
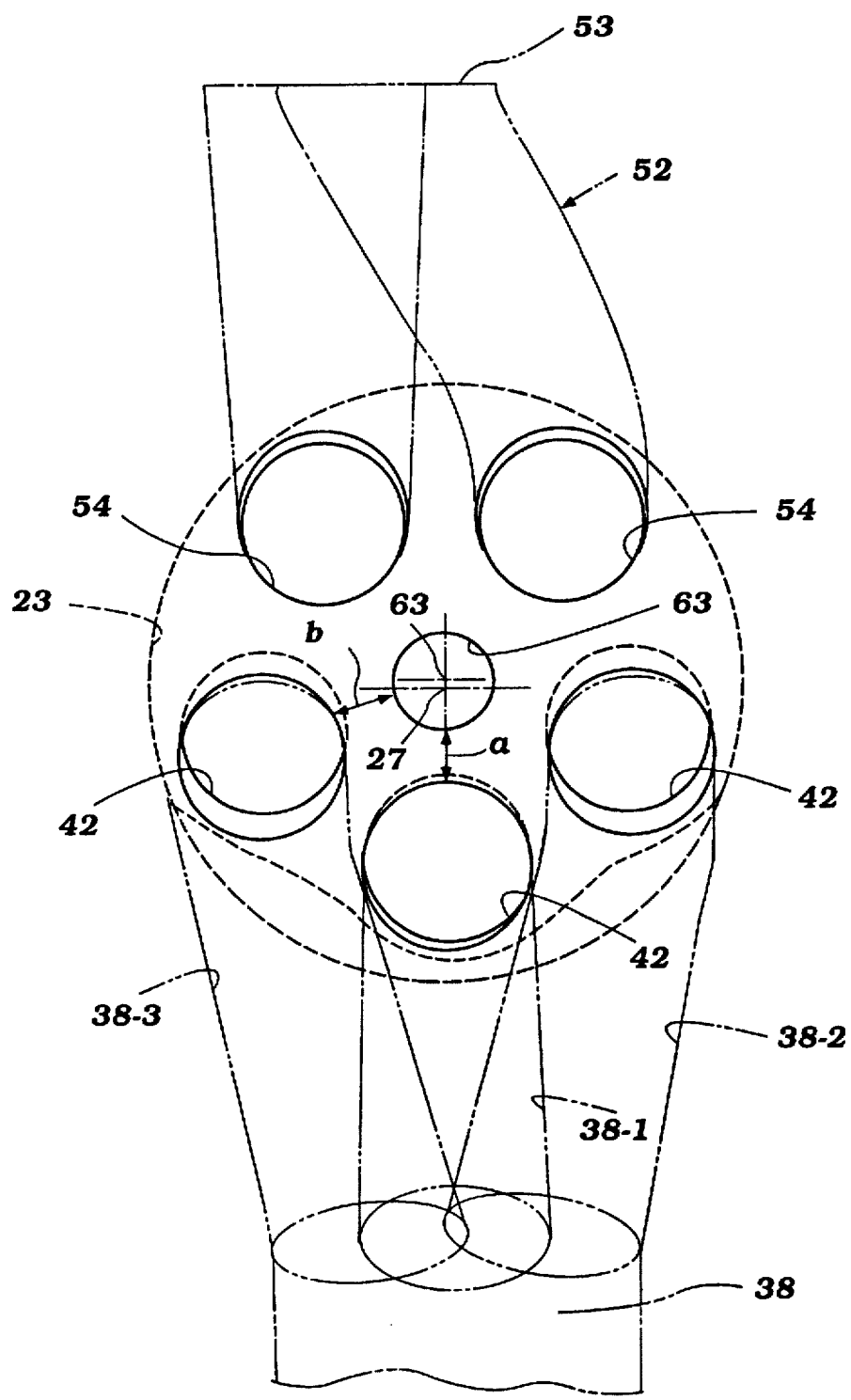
FIG. 2 is a view showing the valve seats and the configuration of the intake and exhaust passages and is taken along a plane parallel to the plane of FIG. 1, but passing through the cylinder head.

Turning now to the exhaust side of the engine which is shown primarily in FIGS. 2-4, individual or siamese exhaust passages 52 extend from outlet openings in a side surface 33 of the cylinder head 23 to which an exhaust manifold (not shown) is attached. These exhaust passages 52 terminate in exhaust valve seats 54 formed in the combustion chamber recesses 32 of the cylinder head 25.

Exhaust valves 55 of the poppet-type have their head portions adapted to control the flow through the exhaust valve seats 54 in a well known manner. The exhaust valves 55 are slidably supported in the cylinder head for reciprocation along axes defined by exhaust valve guides 56 suitably affixed in the cylinder head 25. The axes 57 of reciprocation of the exhaust valves 55 lie in a common plane that is disposed at an acute angle θe to the plane 27 containing the cylinder bore axis. This acute angle is equal to or greater than the acute angle θ3 of the side intake valves 43-2 and 43-3 and greater than that θc of the center intake valve 43-1. These axes are not, in the illustrated embodiment, skewed in the plane of FIG. 5.

Coil compression springs 58 encircle the stems of the exhaust valves 55 and act against machined surfaces of the cylinder head 25 and keeper retainer assemblies 59 for urging the exhaust valves 55 to their closed positions. An upstanding wall portion of the cylinder head 25 is formed with a pair of parallel bores 61 for each cylinder 23. Thimble or bucket-type tappets 62 are slidably supported in the bores 61 and engage the stems of the valves 55 and keeper retainer assemblies 59 for actuating the exhaust valves 55. The thimble tappets 62 are actuated by lobes 28-1 and 28-2 of the exhaust cam shaft 28.

Spark plug wells are formed in the cylinder head 25 centrally over the combustion chamber recesses 32. A threaded opening formed at the lower portion of the wells receives a spark plug 63 so that its spark gap will be positioned substantially centrally within the recess 32 of the cylinder head 25.

It should be noted that the wells and spark plugs 63 lie on an axis 54 (FIGS. 3 and 4) that is disposed at an acute angle θp to the plane 27 and cylinder bore axis on the exhaust side of the engine. This angle θp is less than the acute angle of the reciprocal axes θe of the exhaust valves 55.

The construction of the engine 21 as thus far described may be considered to be the same as in my copending application, Ser. No. 08/363,708. Where any details of the construction of the engine 21 are lacking, reference may be had to that application for such details.

Figure 6:
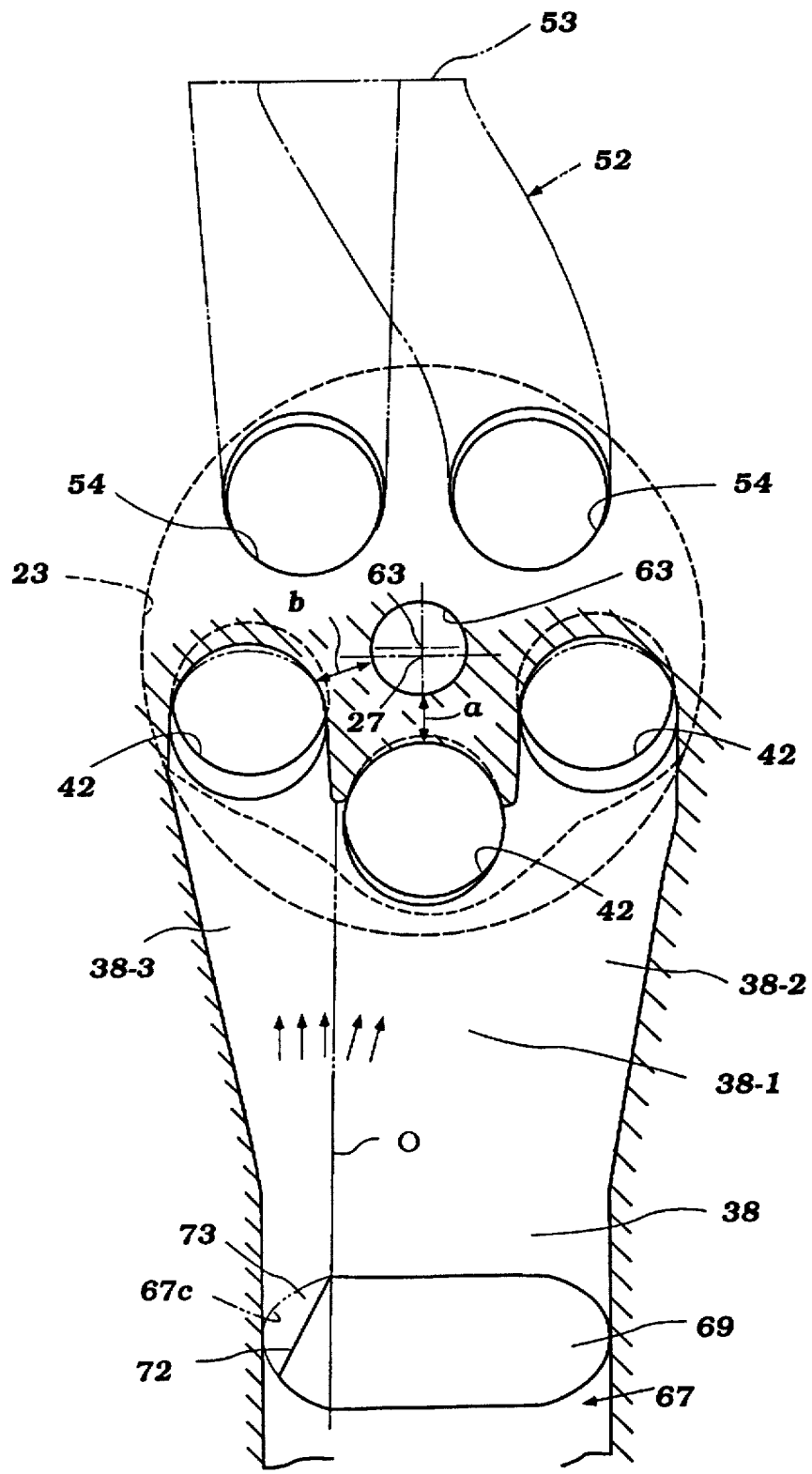
FIG. 6 is a view, in part similar to FIG. 2, but shows a true cross-sectional view taken through the intake passage of one cylinder and shows the flow direction when the control valve is in its flow redirecting position.

The induction system comprised of the induction passage 38 and its branch passageways 38-1, 38-2 and 38-3, are configured to provide good induction efficiency and very low flow resistance. As has been noted, however, the side intake passages 38-2 and 38-3 are configured so that they will generate some tumble action in the combustion chamber. However, this tumble action may be relatively slight in order not to decrease volumetric efficiency, particularly at high speed/high load conditions. In addition, the size of the passageway 38 is relatively unrestricted and, accordingly, the flow into the combustion chamber formed by the recesses 32, the cylinder bore and the piston head 33 with its recess will be relatively slow and lacking in any significant amount of turbulence. Therefore, and in accordance with the invention, a control valve assembly, indicated generally by the reference numeral 65, and shown in most detail in FIGS. 4, 6 and 7, is provided for restricting the flow through the induction passage 38 under low speed and low load conditions and for redirecting it.

The control valve assembly 65 is comprised of a valve body 66 which is provided with flow passageways 67 that have a configuration which is complementary to the inlet opening 39 of each cylinder head intake passage 38. As has been previously noted, this configuration is generally that of an oval and, as is shown in FIG. 7, is comprised of generally planar upper and lower surfaces 67a and 67b, and curved side surfaces 67c and 67d.

Control valve assemblies, indicated generally by the reference numeral 68, are provided for controlling the effective opening area of the passages 67. These control valve assemblies 68 each include a plate-type control valve 69 and a supporting control valve shaft 71. For a reason which will be described, the control valve shaft 71 is disposed centrally in the opening 67 and extends across the short dimension or between the upper and lower surfaces 67a and 67b. This has two advantages. The first of these is that when the control valve 67 is rotated from its closed position, as shown in FIGS. 4 and 7, to its opened position, the control valve shaft 71 will obstruct a lesser amount of the surface area of the cross-sectional area of the opening 67, then if the shaft 71 extended horizontally, as shown at 71h, in phantom lines in FIG. 7.

Figure 7:
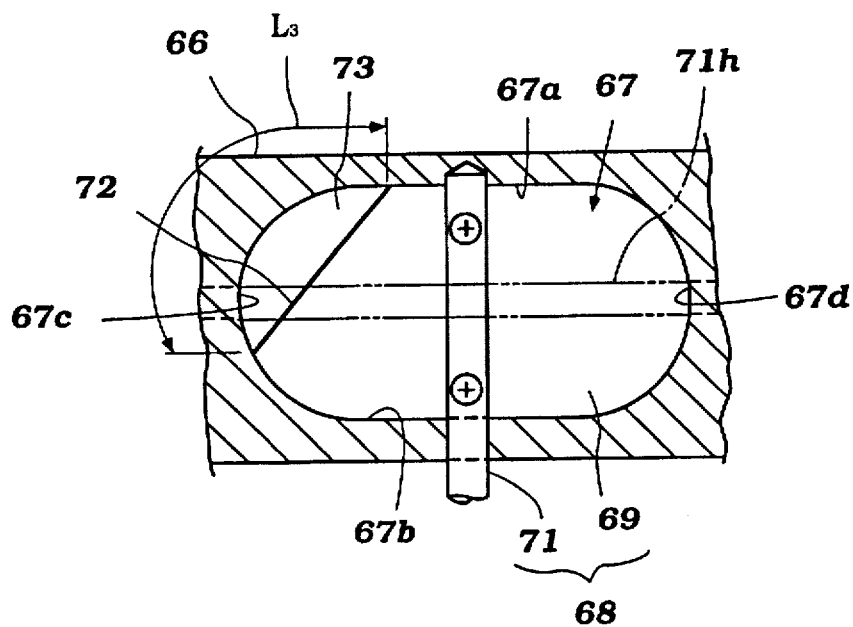
FIG. 7 is a cross-sectional view taken along the line 7—7 of FIG. 4 and shows the flow control valve in its closed position.

In addition, although the plate-type valve 67 has a shape generally configured complementary to the opening 67, it is formed with a cutoff edge 72, which provides a flow opening 73, as shown in FIG. 7, which extends through a dimension L3. This opening 73 is disposed on the upper side of a horizontally extending axis and on the left-hand side of the intake passage, as shown in FIG. 7, and as shown in FIG. 6. Thus when the control valve assembly 68 is moved to its flow controlling position, the intake charge will be directed primarily toward the side intake passage branch 38-3 and the valve seat 42 formed thereby. A small amount of flow may also pass toward the center intake valve seat 42 through the center branch intake passage 38-1.

Furthermore, since the top portion of the plate 69 is cut off, the flow will pass primarily through the upper portion of the intake passage branches 38-1 and 38-3 so as to be directed toward the portion of the valve seats 42 formed thereby closest to the plane 27 containing the axis of the cylinder bore. Hence, a further inducement or supplemental tumble action will be generated under this condition so as to increase the turbulence in the combustion chamber. Also, since the flow will be primarily into the cylinder bore 23 at one side, there will be a swirl generated along with the tumble.

As may be seen also in FIG. 7, if the valve shaft 71 were disposed in the position shown at 71h, then a portion of this valve shaft would extend across the opening 73 and obstruct the flow, which would reduce the tumble action and otherwise compromise the design.

Figure 8:
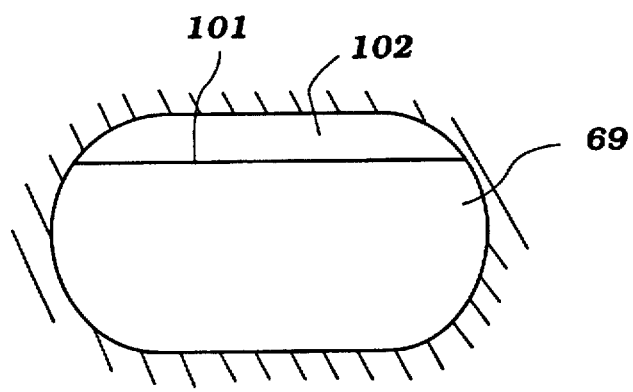
FIG. 8 is a cross-sectional view, in part similar to FIG. 7, and shows another embodiment of the invention.

Of course, under some conditions, different valve shapes may be employed, and with these other valve shapes, then the valve shaft 71 can be placed in the alternate location 71h~. FIG. 8 shows such an arrangement, wherein the valve plate 69 is provided with only a horizontally disposed cutoff 101 so as to provide a flow area 102 which will lead to each of the branch passages 38-1, 38-2 and 38-3. Hence, no swirl will be generated with the type of flow enhancement provided by the valve shown in FIG. 8. However, the tumble action will be accelerated because the flow through all of the intake valve seats 42 will be directed toward the opposite side of the cylinder bore 23 so as to enhance the tumble action.

Figure 9:
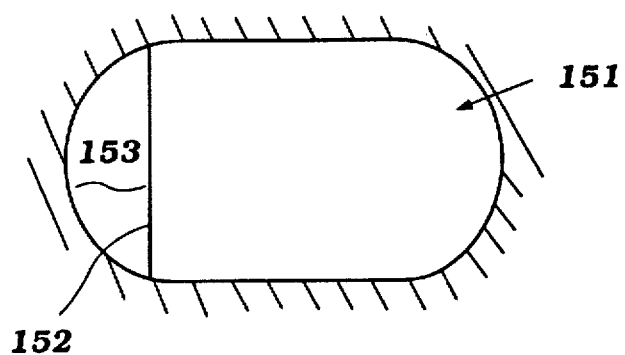
FIG. 9 is a cross-sectional view, in part similar to FIGS. 7 and 8, and shows a still further embodiment of the invention.

A control valve constructed in accordance with another embodiment of the invention is shown in FIG. 9, and this differs from the embodiments previously described only in the shape of the valve plate, indicated in this embodiment by the reference numeral 151. In this embodiment, a cutoff 152 is provided at one side of the valve plate 151 so as to provide a flow opening 153 that will be disposed substantially on one side of the intake passage 38. Hence, flow will be promoted primarily through the side intake branch passage 38-3 and swirl will be generated in addition to the tumble action. However, the tumble action will not be enhanced from that provided under conditions when the control valve 151 is opened because the flow will not be directed toward the side of the intake valve seat 42 adjacent the plane 27.

Figure 10:
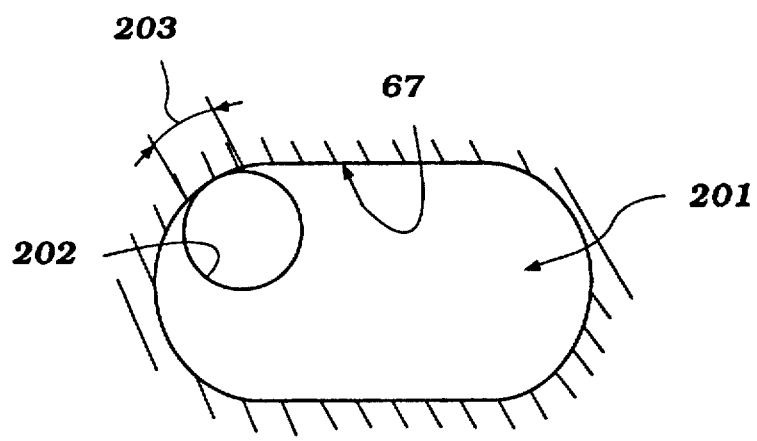
FIG. 10 is a cross-sectional view, in part similar to FIGS. 7–9, and shows a yet further embodiment of the invention.

FIG. 10 shows another embodiment which differs from the previous embodiments only in the shape of the control valve plate, indicated by the reference numeral 201 in this figure. In this embodiment, the valve plate 201 is provided with a cutout 202 which has a generally cylindrical shape and which defines a narrow flow area 203 adjacent the periphery of the opening 67 so as to direct the flow primarily toward the side of the intake branch passage 38-3 and toward the side of its valve seat 42 closest to the plane 27 so as to generate both swirl and tumble.

It will be seen that the embodiments of FIGS. 9 and 10 will profit by utilizing a valve shaft placement as shown in FIG. 7. The embodiment of FIG. 8 can accommodate either type of control valve shaft placement without the control valve shaft obscuring any of the flow area, even when the valve is in its closed position.

Returning again to the description of FIG. 4, the valve shaft 71 has a lever arm 74 which is affixed to it and which may be coupled to a servomotor and the other valve shafts by a linkage arrangement 75 so that all control valves 68 will be operated simultaneously and in synchronism. Any desired control strategy may be employed, but generally, the control valves 68 are positioned in their flow controlling closed positions, as shown in FIGS. 6-10, under low speed/low load conditions, and are opened as the engine reaches its high speed/high load range.

Figure 11:
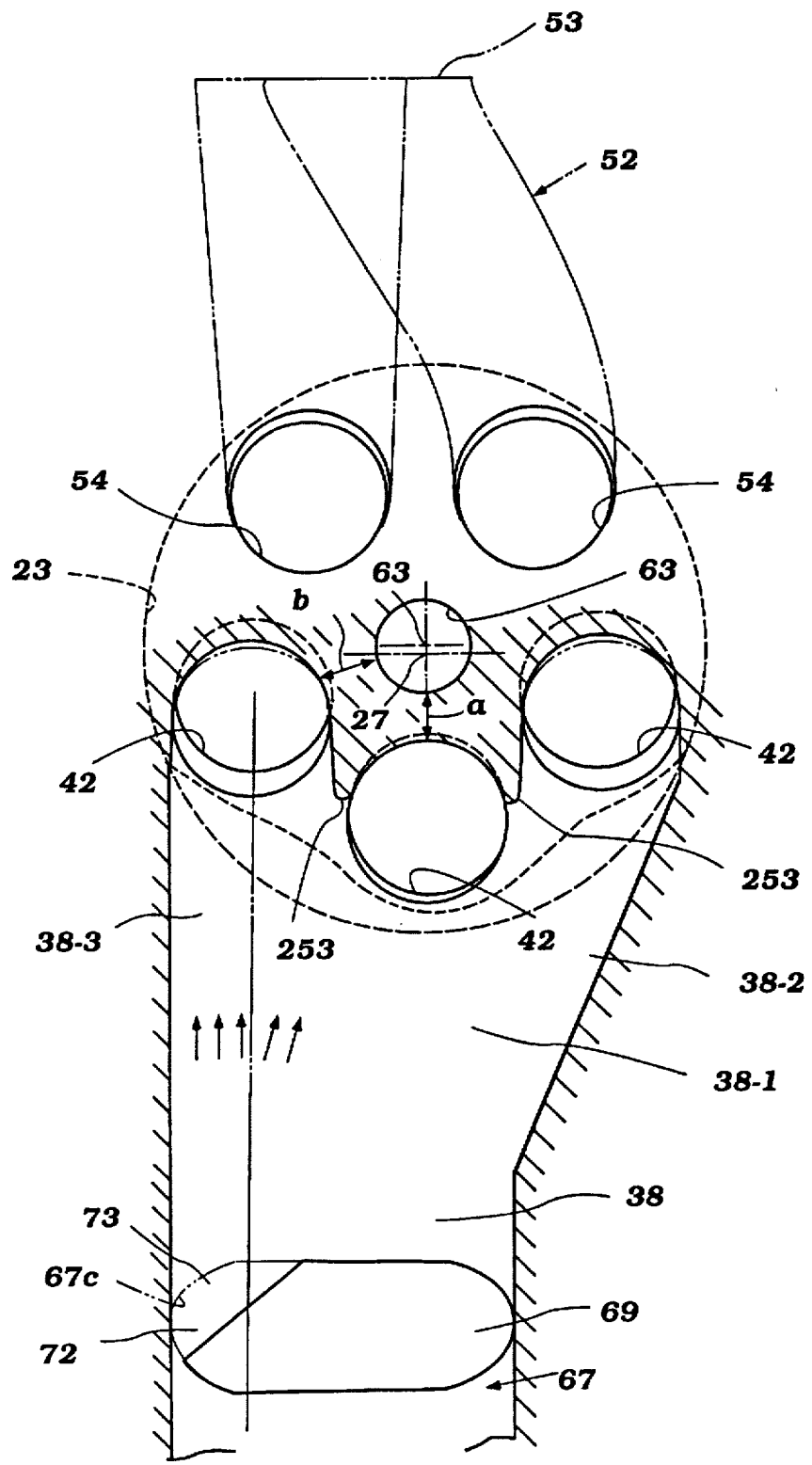
FIG. 11 is a cross-sectional view, in part similar to FIG. 6, and shows a still further embodiment of the invention.

As may be seen in FIG. 11, when using a cutoff portion as shown in FIG. 7, it is possible to change or widen the flow area at the top of the passage portion 67 so as to direct more or less flow toward the center intake valve passage 38-1 and its valve seat 42. Also, this configuration causes a greater portion of the flow toward the center valve seat 42 to be at its upper edge, and thus tumble is further enhanced. In this embodiment, the end of the cutout, indicated by the reference numeral 251, is disposed so that the resulting flow area 252 will terminate at approximately a point in line with the dividing wall at the side of the center intake valve seat 42-1 and which wall is indicated by the reference numeral 253 in FIG. 11.

Thus, from the foregoing description, it should be readily apparent that the described cylinder head and control valve arrangements are effective in providing high volumetric efficiency under high speed/high load conditions and also tumble and/or swirl and a higher velocity flow when the control valves are in their closed position so as to improve running under low speed/low load conditions. Of course, the foregoing description is that of preferred embodiments of the invention, and various changes and modifications may be made without departing from the spirit and scope of the invention, as defined by the appended claims.

I claim:

1. An induction system for an internal combustion engine having a combustion chamber served by at least three intake valve seats, an intake passage arrangement comprised of at least a common section serving each of said intake valve seats, a butterfly-type control valve supported for pivotal movement in said common section about an axis passing through said common section for controlling the flow therethrough and movable between a first position wherein the flow through each of said valve seats is substantially unrestricted and without significantly affecting the flow direction issuing from said intake valve seats into said combustion chamber and a second position wherein at least a substantial portion of the flow area is substantially restricted by a body of said butterfly-type control valve, said body having a relief formed therein which defines a restricted flow area through said common section for directing the flow through at least one of the valve seats into the combustion chamber in a different direction when said butterfly-type control valve is in its second position than when in its first position, the pivot axis of said butterfly-type control valve being spaced from said relief.

2. An induction system as in claim 1, wherein the flow through the one valve seat when the butterfly-type control valve is in its second position is directed more to one edge of the valve seat than the another edge of the valve seat.

3. An induction system as in claim 2, wherein the directed flow in the second position of the butterfly-type control valve effects tumble in the combustion chamber.

4. An induction system as in claim 3, wherein the redirected flow when the control valve is in its second position also effects swirl in the combustion chamber by causing more flow along one side of the axis of the combustion chamber than along the other side of the combustion chamber axis.

5. An induction system as in claim 1, wherein the butterfly-type control valve is supported for pivotal movement on a control valve shaft which passes at least in part through the common section.

6. An induction system as in claim 5, wherein the common section has a generally oval shape.

7. An induction system as in claim 6, wherein the control valve shaft extends transversely across the center of the common section and between its closer sides.

8. An induction system as in claim 7, wherein the butterfly-type control valve has a generally oval shape interrupted only by a cutout formed on one side of the control valve shaft.

9. An induction system as in claim 8, wherein the cutout portion extends at an angle to the control valve shaft.

10. An induction system as in claim 8, wherein the cutout comprises a circular section.

11. An induction system as in claim 8, wherein the cutout extends parallel to the control valve shaft, but is spaced therefrom.

12. An induction system as in claim 6, wherein the control valve plate has a generally oval shape with the upper portion removed so as to direct the flow to the upper portion of the intake passage when in its second position.

13. An induction system as in claim 1, wherein there are provided a pair of side intake valve seats disposed closer to a plane containing the axis of the combustion chamber and a center valve seat disposed between the side intake valve seats and further from the plane.

14. An induction system as in claim 13, wherein the flow through one of the side valve seats is substantially restricted when the control valve is in its second position.

15. An induction system as in claim 13, wherein the flow through the center intake valve seat is substantially restricted when the control valve is in its second position.

16. An induction system as in claim 13, wherein the control valve redirects the flow to the combustion chamber through at least one of the side intake valve seats when in its second position.

17. An induction system as in claim 16, wherein the control valve redirects the flow to both of the side valve seats when in its second position.

18. An induction system as in claim 17, wherein the control valve also redirects the flow to the center valve seat when in its second position.

19. An induction system as in claim 16, wherein the control valve redirects the flow through the center valve seat when in its second position.

20. An induction system as in claim 19, wherein the control valve substantially restricts the flow to the other side valve seat when in its second position.

21. An induction system as in claim 13, wherein the butterfly-type control valve is supported for pivotal movement on a control valve shaft which passes at least in part through the common section.

22. An induction system as in claim 21, wherein the common section has a generally oval shape.

23. An induction system as in claim 22, wherein the control valve shaft extends transversely across the center of the common section and between its closer sides.

24. An induction system as in claim 23, wherein the butterfly-type control valve has a generally oval shape interrupted only by a cutout formed on one side of the control valve shaft.

25. An induction system as in claim 24, wherein the cutout portion extends at an angle to the control valve shaft.

26. An induction system as in claim 24, wherein the cutout comprises a circular section.

27. An induction system as in claim 24, wherein the cutout extends parallel to the control valve shaft, but is spaced therefrom.

28. An induction system as in claim 22, wherein the control valve plate has a generally oval shape with the upper portion removed so as to direct the flow to the upper portion of the intake passage when in its second position.

29. A control valve arrangement for the induction system of an internal combustion engine, said control valve comprising a housing defining an oval flow passage having a major axis and a substantially smaller minor axis, a butterfly-type control valve for controlling the flow through said flow passage and having a shape generally complimentary to the shape of the flow passage with a relieved area in one edge thereof, a control valve shaft to which said control valve is affixed and supported for pivotal movement in said control valve housing, said control valve shaft being spaced from said relief.

30. A control valve arrangement as in claim 29, wherein the control valve shaft extends transversely across the center of the flow passage and between its closer sides.

31. A control valve arrangement as in claim 30, wherein the butterfly-type control valve has a generally oval shape interrupted only by a cutout formed on one side of the control valve shaft.

32. A control valve arrangement as in claim 31, wherein the cutout portion extends at an angle to the control valve shaft.

33. A control valve arrangement as in claim 31, wherein the cutout comprises a circular section.

34. A control valve arrangement as in claim 31, wherein the cutout extends parallel to the control valve shaft, but is spaced therefrom.

35. A control valve arrangement as in claim 29, wherein the control valve plate has the upper portion removed so as to direct the flow to the upper portion of the flow passage when closed.

* * * * *